US009448854B2

(12) United States Patent
Hirsch et al.

(10) Patent No.: US 9,448,854 B2
(45) **Date of Patent: *Sep. 20, 2016**

(54) FULL EXPLOITATION OF PARALLEL PROCESSORS FOR DATA PROCESSING

(71) Applicant: INTERNATIONAL BUSINESS MACHINES CORPORATION, Armonk, NY (US)

(72) Inventors: Michael Hirsch, Mazkeret Batya (IL); Shmuel T. Klein, Rehovot (IL); Yair Toaff, Givat Shmuel (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,351

(22) Filed: Apr. 11, 2016

(65) Prior Publication Data

US 2016/0224391 A1 Aug. 4, 2016

Related U.S. Application Data

(63) Continuation of application No. 14/623,919, filed on Feb. 17, 2015, which is a continuation of application No. 13/361,544, filed on Jan. 30, 2012, now Pat. No. 8,959,522.

(51) Int. Cl.

| | |
|---|---|
| ***G06F 9/46*** | (2006.01) |
| ***G06F 9/50*** | (2006.01) |
| ***G06F 17/30*** | (2006.01) |

(52) U.S. Cl.

CPC ....... *G06F 9/5077* (2013.01); *G06F 17/30303* (2013.01)

(58) Field of Classification Search

None

See application file for complete search history.

(56) References Cited

U.S. PATENT DOCUMENTS

| | | | |
|---|---|---|---|
| 5,159,686 | A | 10/1992 | Chastain et al. |
| 5,909,681 | A | 6/1999 | Passera et al. |
| 5,991,866 | A | 11/1999 | Heller et al. |
| 6,065,005 | A | 5/2000 | Gal et al. |
| 6,088,511 | A | 7/2000 | Hardwick |
| 7,536,432 | B2 | 5/2009 | Yamamoto |

FOREIGN PATENT DOCUMENTS

| | | | |
|---|---|---|---|
| CN | 101523381 | A | 9/2009 |
| WO | 2008021024 | A2 | 2/2008 |
| WO | 2011114477 | A1 | 9/2011 |

OTHER PUBLICATIONS

Lu et al., "Data Layout Transformation for Enhancing Data Locality on NUCA Chip Multiprocessors," IEEE, AN-10891807, 2009.

(Continued)

*Primary Examiner* — Lewis A Bullock, Jr.
*Assistant Examiner* — Melissa Alfred
(74) *Attorney, Agent, or Firm* — Griffiths & Seaton PLLC

(57) ABSTRACT

Exemplary method, system, and computer program product embodiments for full exploitation of parallel processors for data processing are provided. In one embodiment, by way of example only, a set of parallel processors is partitioned into disjoint subsets according to indices of the set of the parallel processors. The size of each of the disjoint subsets corresponds to a number of processors assigned to the processing of the data chunks at one of the layers. A transition function is devised from the indices of the set of the parallel processors at one time steps to the indices of the set of the parallel processors at a following time step.

21 Claims, 10 Drawing Sheets

300

BEGIN (302)

PARTITION PROCESSORS INTO INDEX SETS (304)

ASSIGN PROCESSORS TO ONE OF A MULTIPLE OF LAYERS OF THE DATA CHUNKS (306)

PROCESS THE DATA CHUNKS WITHIN A NUMBER OF TIME STEPS EQUAL TO THE NUMBER OF THE LAYERS (308)

DEVISE A TRANSITION FUNCTION FOR ONE OF THE TIME STEPS (310)

END (312)

(56) References Cited

OTHER PUBLICATIONS

Markatos et al., "Using Processor Affinity in Loop Scheduling on Shared-Memory Multiprocessors," 1992.

Yue, "Performance Issues in Parallel Loop Scheduling for Multiprogrammed Multiprocessors," Jun. 1996.

Ludwig et al., "Massively Parallel Processing on Peer-to-Peer Systems," Department of Computer Science, Rochester Institute of Technology, 2004.

800

| LAYER 0 | LAYER 1 | LAYER 2 | LAYER 3 | LAYER 4 |
|---|---|---|---|---|
| 0 00000 | 1 00001 | 3 00011 | 7 00111 | 15 01111 |
| 2 00010 | 5 00101 | 11 01011 | 23 10111 | |
| 4 00100 | 9 01001 | 19 10011 | | |
| 6 00110 | 13 01101 | 27 11011 | | |
| 8 01000 | 17 10001 | | | |
| 10 01010 | 21 10101 | | | |
| 12 01100 | 25 11001 | | | |
| 14 01110 | 29 11101 | | | |
| 16 10000 | | | | |
| 18 10010 | | | | |
| 20 10100 | | | | |
| 22 10110 | | | | |
| 24 11000 | | | | |
| 26 11010 | | | | |
| 28 11100 | | | | |
| 30 11110 | | | | |

Table 1: Partition of the indices 0 - 30 into layers

| LAYER 0 | LAYER 1 | LAYER 2 | LAYER 3 | LAYER 4 |
|---|---|---|---|---|
| 1 00001 | 2 00010 | 4 00100 | 8 01000 | 16 10000 |
| 3 00011 | 6 00110 | 12 01100 | 24 11000 | |
| 5 00101 | 10 01010 | 20 10100 | | |
| 7 00111 | 14 01110 | 28 11100 | | |
| 9 01001 | 18 10010 | | | |
| 11 01011 | 22 10110 | | | |
| 13 01101 | 26 11010 | | | |
| 15 01111 | 30 11110 | | | |
| 17 10001 | | | | |
| 19 10011 | | | | |
| 21 10101 | | | | |
| 23 10111 | | | | |
| 25 11001 | | | | |
| 27 11011 | | | | |
| 29 11101 | | | | |
| 31 11111 | | | | |

Table 2: Partition of the indices 1 - 31 into layers

FIG. 9

Index layout for transition from time step *i* to *i* + 1

FULL EXPLOITATION OF PARALLEL PROCESSORS FOR DATA PROCESSING

CROSS-REFERENCE TO RELATED APPLICATIONS

This Application is a Continuation of U.S. patent application Ser. No. 14/623,919, filed Feb. 17, 2015, which is a Continuation of U.S. patent application Ser. No. 13/361,544, now U.S. Pat. No. 8,959,522, filed Jan. 30, 2012.

BACKGROUND OF THE INVENTION

1. Field of the Invention

The present invention relates generally to computers, and more particularly, for full exploitation of parallel processors for data processing in a computing environment.

2. Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data is copied again and again and forwarded without any change, by locating repeated data and storing only its first occurrence. Subsequent copies are replaced with pointers to the stored occurrence, which significantly reduces the storage requirements if the data is indeed repetitive. Processing very large amounts of information is a key problem to solve, and therefore, a need exists to improve the processing, for example by using a set of processors working in parallel. In certain applications, the set of processors can be assigned to perform some task in several stages or layers, and the task can repeatedly be split into sub-tasks in a hierarchical way. The performance of the system ultimately depends on the layout of how exactly the processors are assigned to their sub-tasks, therefore a need exists for improved processor layout for hierarchical parallel computations.

SUMMARY OF THE DESCRIBED EMBODIMENTS

As mentioned, processing very large amounts of information and data occurring in storage system is a key problem to solve. For example, in data deduplication (Data deduplication refers to the reduction and/or elimination of redundant data), a data object, which may be a file, a data stream, or some other form of data, is broken dowry into one or more parts called chunks, using a chunking method. In a data deduplication process, duplicate copies of data are reduced or eliminated, leaving a minimal amount of redundant copies, or a single copy of the data, respectively. Using deduplication processes provides a variety of benefits, such as reduction of required storage capacity and increased network bandwidth. Due to these and other benefits, deduplication has emerged in recent years as a highly important technological field in computing storage systems. In another storage system, there may be multiple transactions concurrently writing unrelated data.

Accordingly, and in view of the foregoing, various embodiments for full exploitation, after a plurality of initialization steps, of a set of parallel processors to perform a task on a sequence of data chunks, wherein each of the data chunks are processed in several time steps and by a plurality of layers with the plurality of layers being dealt with by at least one of a plurality of processors at each of the time steps, are provided. In one embodiment, by way of example only, a method comprises partitioning the set of the plurality of parallel processors into disjoint subsets according to indices of the set of the plurality of parallel processors such that wherein, the plurality of parallel processors are partitioned in accordance with one or more of a plurality of constraints; the number of the plurality of parallel processors that are available is $n=2^d-1$, where d is the number of the plurality of layers, n is the number of the plurality of parallel processors, and $2^d-1$ is also equal to $n=(2^d)-1$, and a size of each of the disjoint subsets corresponds to a number of the plurality of processors assigned to the processing of the data chunks at one of the plurality of layers; partitioning the task into the plurality of layers independent of partitioning the set of the plurality of parallel processors; and selecting and using one of a plurality of constraints for restricting any one of the plurality of parallel processors to always work on the same one of the plurality of layers or, for each of the plurality of layers except for a first layer, to always work on a same data chunk as in each of the previous layers; wherein the number of the plurality of parallel processors that are available is $n=2^d-1$, where d is the number of the plurality of layers and n is the number of the plurality of parallel processors and $2^d-1$ is also equal to $n=(2^d)-1$, the number of the plurality of processors assigned to level 0 is $n=2^{d-1}$, and the number of the plurality of processors assigned to the processing of the data chunks at one of the plurality of layers which is not the first is half of the number of the plurality of processors assigned to the processing of the data chunks at the previous one of the plurality of layers.

In addition to the foregoing exemplary method embodiment, other exemplary embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 8 illustrates an exemplary partition of the indices 0 (zero) to 30 (thirty)=2n−2 into layers indexed 0 to 4;

FIG. 9 illustrates an exemplary table diagram showing another partition of the indices 0 (zero) to 30 (thirty) into subsets corresponding to sets of processors working in parallel.

DETAILED DESCRIPTION OF CERTAIN EMBODIMENTS

Figure 1:
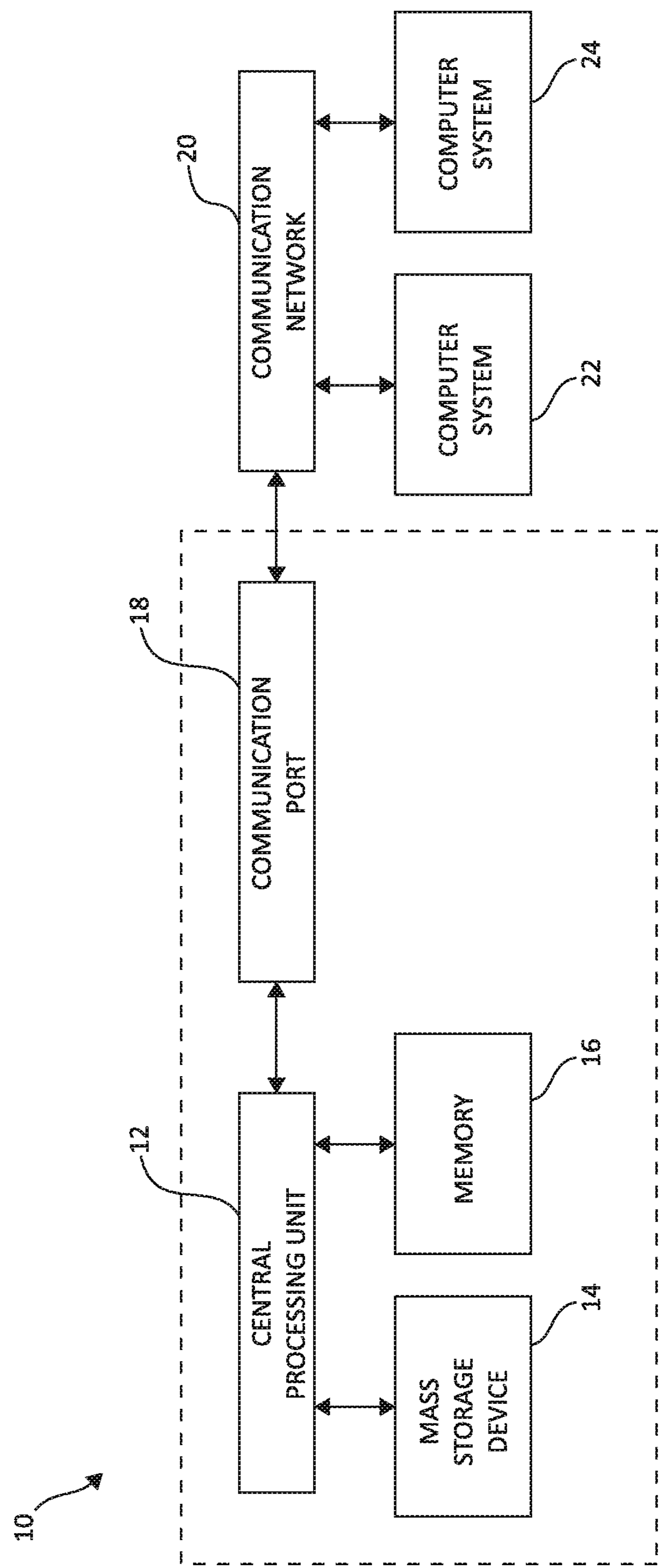
FIG. 1 illustrates a computer storage environment having an example storage device in which aspects of the present invention may be realized.

As mentioned previously, with increasing demand for faster, more powerful and more efficient ways to store information, optimization of storage technologies is becoming a key challenge. As will be described below, the mechanisms of the illustrated embodiments seek to address solutions for processing data chunks where a set or sets of parallel processors are assigned to perform tasks in several stages on the data chunks, and the tasks may repeatedly be split into sub-tasks in a hierarchical way, such that if n processors are needed at some stage, only half of them, that is, n/2 processors, are needed in the next stage. The possibility of using a set of parallel processors to perform a task in several hierarchically connected layers has many applications.

Large storage and backup systems may be compressed by means of deduplication, as previously described, by locating recurrent sub-parts of the text, and replacing them by pointers to previous occurrences. A hash value may be assigned to each data block, but this may only detect identical blocks and may not be suitable when large block sizes are used. Replacing identity by similarity enables the use of much larger data chunks, a process using similarity may be based on the evaluation of a hash function for a large number of strings. For example, a very large repository, such as of the order of 1 petabyte (PB)=$2^{50}$ bytes, may be partitioned into chunks of fixed or variable size, to each of which one or more signatures are assigned. The signature of a chunk is may be a function of the set of hash values produced for each consecutive substring of k bytes within the chunk. The length k of these sub strings, which may be referred throughout this description as "seeds", may be 512 bits or more, but the evaluation may place burdens on the processing time. The hash function used in this application is the remainder function modulo a large prime number P. In other words, we identify a seed B, which is a character string of length K, with its ASCII encoding and consider this encoding as the standard binary representation of a large 8 k-bit long integer. The hash function is then represented by the equation:

$$h(B)=B \bmod P \tag{1}$$

where B is the remainder function and P is the large prime number. Given a chunk C=$X_1$, $X_2$, . . . $X_i$ where the $x_i$ denotes characters of an alphabet, the hash function h may be applied on the set of substrings $B_i$ of C of length k, where $$B_i=X_i*X_i+1, \ldots ,X_i+K-1 \tag{2}$$

is the substring starting at the i-th character of C. This may be done in constant time for i>1, as the evaluation of $B_i$ may be based on the value obtained earlier for $B_i$−1, but this is obviously may not be true for the first value to be used. That is, $B_i$ may need an evaluation time proportional to k.

In particular, in the improvement of the evaluation time of the remainder function, in a first stage referred to as step 0, a set of n processors may be assigned to work simultaneously on n data chunks. In step 1, only n/2 processors are used, each acting on two chunks evaluated in the previous step, and in general in step i, only $n/2^i$ processors are used, each acting on two chunks evaluated in the previous step 1-1. Finally, in step log a, only a single processor is used. While the overall work of all the processors together is not reduced relative to an equivalent sequential evaluation on a single processor, the total processing time, if it is accounted only once for commands executed in parallel, is reduced from O(n) operations to O(log n) operationsO(n)operationstoO(log n) operations.

However, only in the first stage is the set of processors fully exploited, and in fact, for reasonable choices of n, most of the processors remain idle for most of the time. The average number of occupied processors is given by the equation:

$$\frac{n+\frac{n}{2}+\frac{N}{4}+\ldots\ +2+1}{1+\log n}=(2n-1)/(1+\log n) \tag{3}$$

where for n=64 resulting in only about 28% of the processors are busy on the average. To address the inefficiencies previously described, the mechanisms of the illustrated embodiments seeks to increase the efficiencies of the processors by grouping several tasks together so as to achieve full exploitation of the available processing power thereby reducing the inefficiency of non-working processors to zero. This optimal utilization of the n processors is achieved by, as described below, assigning processors to the various tasks on various levels of the data chunks. In so doing, throughout the descriptions, reference to a specific processor assignment may be referred to as a layout.

To achieve the full exploitation of a number n of processors all of the time, the required tasks within the computing environment may be performed in parallel. More precisely, since the evaluation of the given function on a single chunk requires log n stages, the processors may be assigned in such a way that a sequence of log n consecutive chunks may be processed simultaneously in parallel. Thus, the mechanisms of the illustrated embodiments design an appropriate layout showing how to assign the available processors at each time step. In particular, the layout is consistent over time transitions from step i to step i+1, while also complying with the hierarchical definition of the function to be evaluated.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10.

Figure 2:
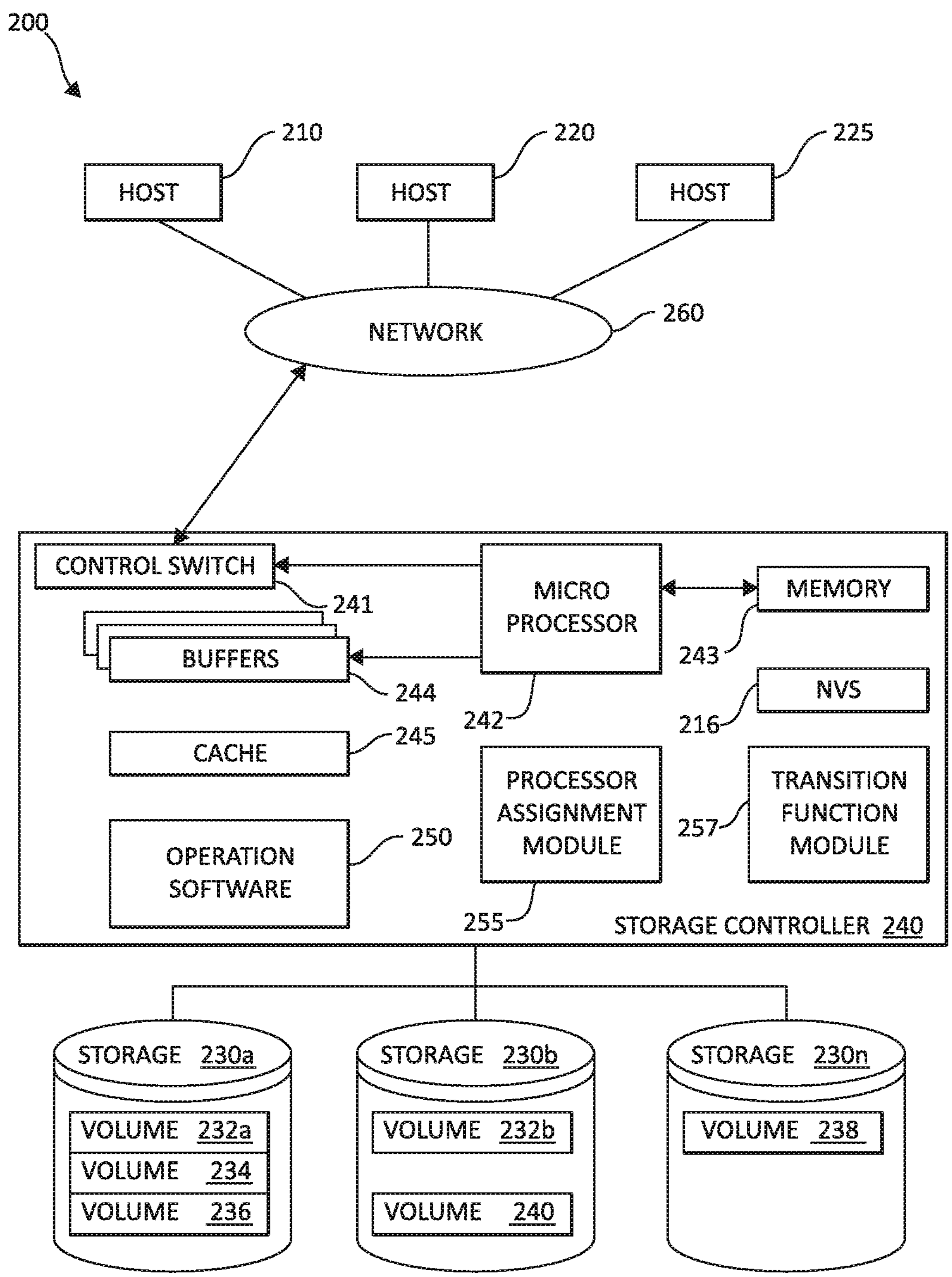
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a processor assignment module 255 and a transition function module 257. The processor assignment module 255 and transition function module 257 may be one complete module functioning simultaneously or separate modules. The processor assignment module 255 and transition function module 257 may have some internal memory (not shown) in which the transition function algorithm may store unprocessed, processed, or "semi-processed" data. The processor assignment module 255 and transition function module 257 may work in conjunction with each and every component of the storage controller 240, the hosts 210, 220, 225, and other storage controllers 240 and hosts 210, 220, and 225 that may be remotely connected via the storage fabric 260. Both the processor assignment module 255 and transition function module 257 may be structurally one complete module or may be associated and/or included with other individual modules. The processor assignment module 255 and transition function module 257 may also be located in the cache 245 or other components of the storage controller 240.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the processor assignment module 255 and the transition function module 257 in which information may be set. Multiple buffers 244 may be implemented to assist with the methods and steps as described herein.

In one embodiment, the cluster hosts/nodes, 210, 220, 225 and the storage controller 240 are connected through a network adaptor (this could be a fibre channel) 260 as an interface i.e., via a switch called "fabric." In one embodiment, the operation of the system shown in FIG. 2 may be described as follows. The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, processor assignment module 255, and transition function module 257 are in communication with each other and may be separate or one individual component(s). Also, several, if not all of the components, such as the operation software 250 may be included with the memory 243. Each of the components within the devices shown may be linked together and may be in communication with each other for purposes suited to the present invention In one embodiment, by way of example only, two possible scenarios may be considered. First, the mechanisms of the present invention may ignore the time needed for each processor to read the assigned data, but rather, consider the possibility of the use of some parameters, which depend only on the index of the currently processed layer of a data chunk, and not on the particular chunk itself. This provides for a layout in which a processor is always assigned to perform a task at the same layer of a data (i.e., data chunks). In a second scenario, input operations are also being considered, which leads to a layout in which the assignment of new data to a processor is reduced to a possible minimum processor assignment. The processor reads new data only after completing the tasks of the data that has been released by the processor. The mechanisms of the illustrated embodiments, as described below, illustrate both of these two examples and achieve the full exploitation of n processors all of the time with the required tasks within the computing environment being performed in parallel.

Figure 3:
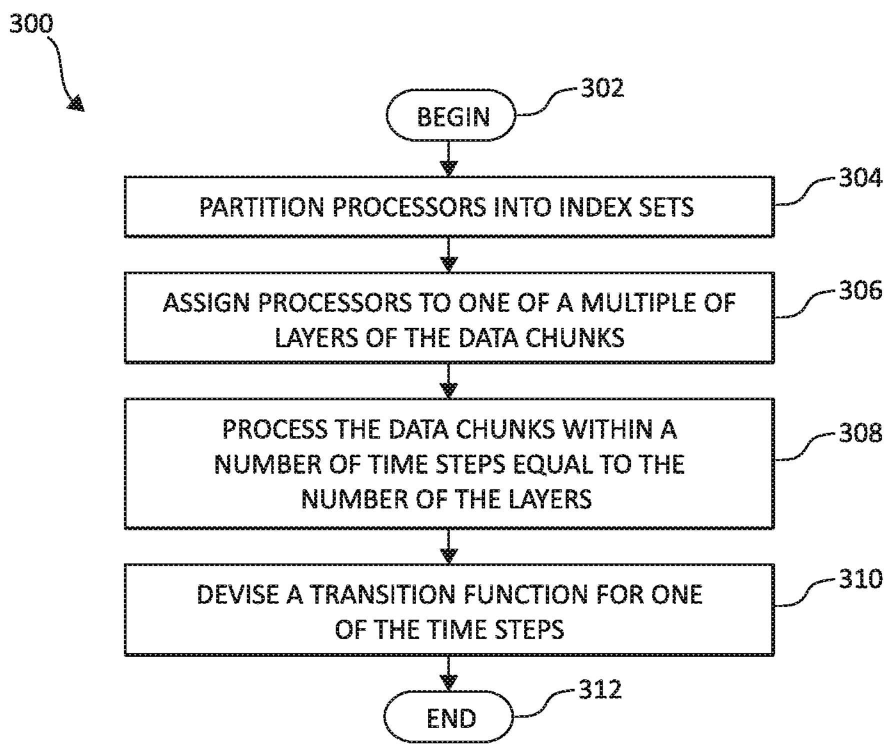
FIG. 3 is a flowchart illustrating an exemplary method for improved processor layout for hierarchical parallel computations for processing data chunks.

FIG. 3 is a flowchart illustrating an exemplary method for improved processor layout for hierarchical parallel computations for processing data chunks. The method begins (step 302). The indices of processors are partitioned according to their indices (step 304). The task to be performed is partitioned into layers (step 305). The processors are assigned to the layers of the task (step 306). The data chunks are processed within a number of time steps equal to the number of layers (step 308). A transition function is devised (and/or calculated) from one time step to the following time step, such that the transition is consistent with the assignment of the processors to the layers (steps 310). The method ends (step 312).

Figure 4:
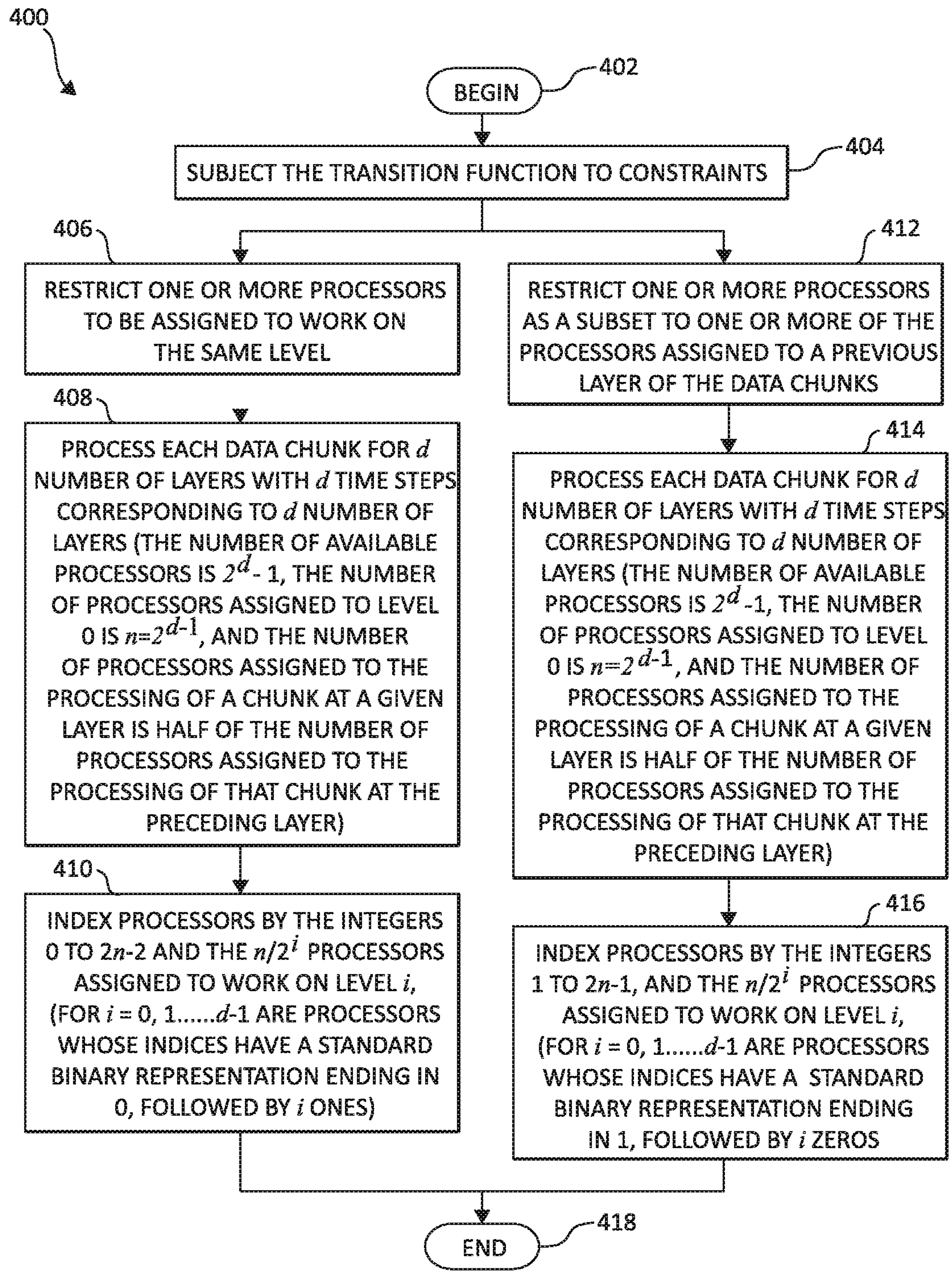
FIG. 4 is a flowchart illustrating an exemplary method for subjecting a transition function to constraints.

Turning to FIG. 4, a flowchart illustrating an exemplary method for subjecting a transition function to constraints is depicted. The method 400 begins (step 402). Each data chunk is processed within d time steps corresponding to the d layers, where the number of processors assigned to level 0 is $n=2^{d-1}$ and we assume the availability of 2n−1 processors. The number of processors assigned to the processing of a chunk at a given layer is one half (½) of the number of processors assigned to the processing of the data chunk at the preceding layer (step 404). Two possible constraints are considered: a first constraint is restricting each processor to be assigned to work always on the same layer and the a second constraint being that for each layer except the lowest one, each processor is restricted to be working with the same data chunk as in the previous layers (step 406). In step 408, the method 400 checks which constraint applies (e.g., the method will determine if a given processor is restricted to work always on the same layer). If it is the first constraint, the method 400 may index the processors by the integers 0 to 2n−2 and the $n/2^i$ and the $n/2^i$ processors assigned to work on layer i, for i=0, 1, d−1, i=0, 1 d−1 are the processors whose indices have a standard binary representation ending in 0 followed by i ones (step 410). If the second constraint applies, the method 400 may alternatively index the processors by the integers 1 to 2n−1 and the $n/2^i$ and the n processors assigned to work on layer i, for i=0, 1 . . . d−1, are the processors whose indices have a standard binary representation ending in 1, followed by i zeros (step 412). The method ends (step 414).

Figure 5:
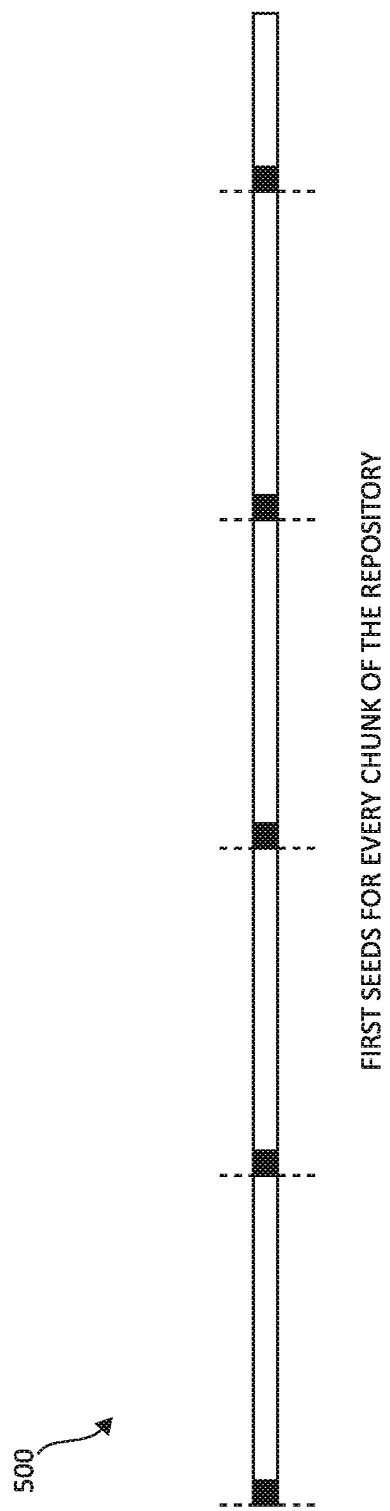
FIG. 5 illustrates an exemplary block diagram showing first seeds for data chunks of a repository.

FIG. 5 illustrates an exemplary block diagram showing first seeds for data chunks of a repository. As mentioned previously, the mechanisms of the illustrated embodiments seek to exploit the processing power of all the processors. However, for only layer 0 would all the processors be active, while for the next layer this is true for only half of the processors, and then for a quarter of the processors for an additional level, etc. In contrast, and to address this inefficiency, by way of example, consider a long sequence of N independent data chunks where the hierarchical signature evaluation is applied on the first seed of each chunk. The sizes involved in a typical setting may be considered to be a repository of 1 PB, partitioned into a sequence of N chunks of fixed size 16 megabyte (MB), achieving $N=2^{26}$, which is, about 64 million chunks, for each of which the first seed of size 512 bytes are processed, as depicted in FIG. 5. In FIG. 5, the data chunks 504 (illustrated in the drawings as 504A-E) are separated by vertical bars 502 (illustrated in the drawings as 502A-D), and the first seeds 506 (illustrated in the drawings as 506A-D), for which the signature has to be evaluated, appear in black. At this point in the example, it may be assumed that n processors are needed for layer 0 and that that 2n−1 processors are available.

Figure 6:
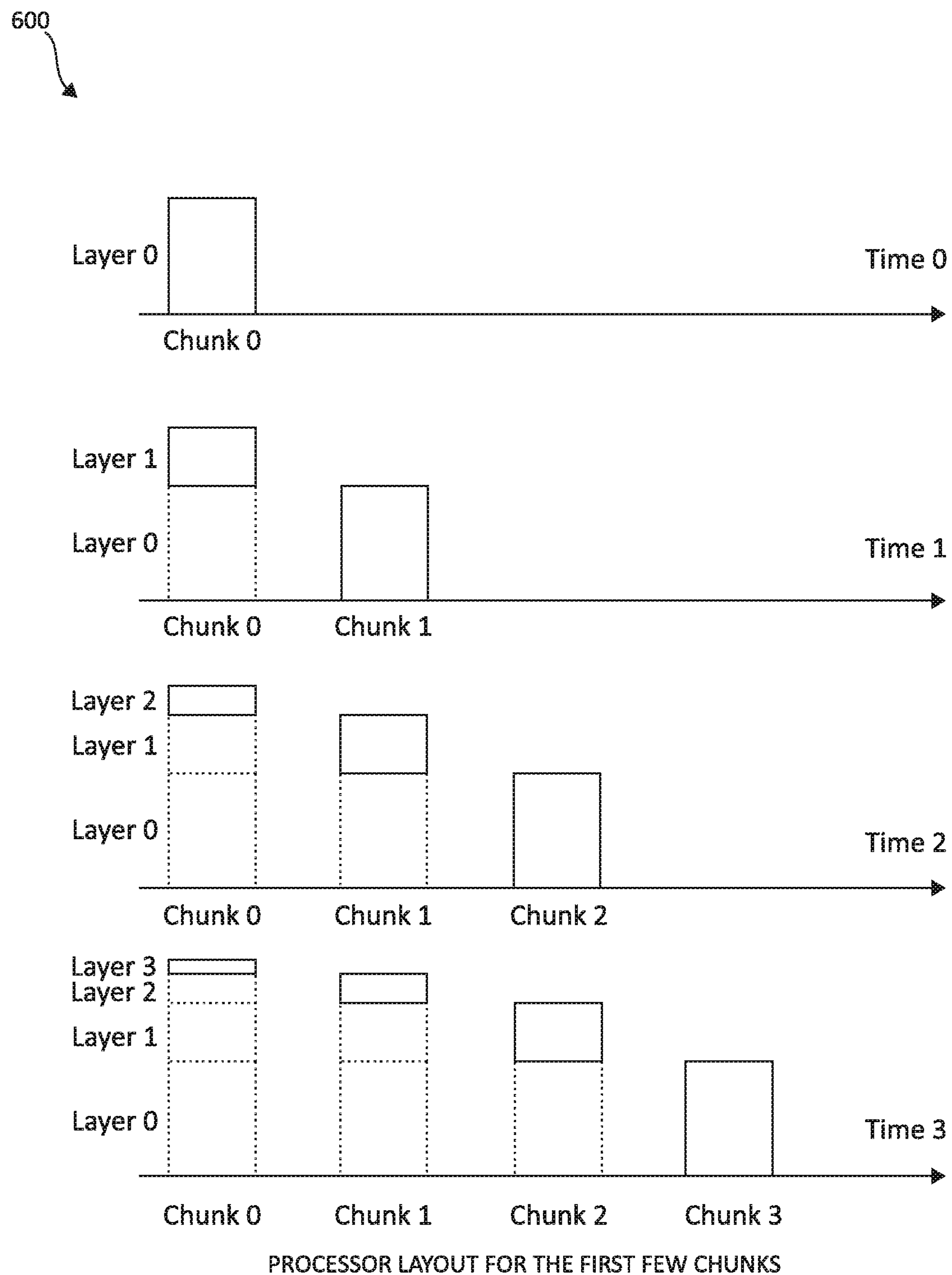
FIG. 6 illustrates an exemplary diagram showing processor layout for several initial data chunks.

The example is further considered and explained by turning to FIG. 6, which illustrates an exemplary diagram showing a processor layout for several initial data chunks. The mechanism of the illustrated embodiments may start at time 0 by assigning n processors to the first chunk (illustrated in the drawings as the chunk indexed "chunk 0"), where the processors perform layer 0 of the parallel evaluation algorithm. At the following step, at time 1, n/2 of the idle processors will perform layer 1 for chunk 0, while the first n processors are reassigned to perform layer 0 of chunk 1. At time 2, n/2 new processors will perform layer 2 for chunk 0 and the n/2 processors working in the previous step on layer 1 for chunk 0 are reassigned to perform layer 1 for chunk 1. The n processors working in the previous step on layer 0 for chunk 1 are reassigned to perform layer 0 for chunk 2. As depicted in FIG. 6, solid lines indicate blocks of currently working processors and broken lines recall processors that have been working on lower layers in earlier time steps.

In general, at time i, i=0, 1, . . . , log n, the set of available processors is partitioned into i+0 uneven parts dealing with the first i+0 chunks as follows: $n/2^i$ new processors may perform layer i of chunk 0, $n/2^{i-1}n/(2^{i-1})$ processors will perform layer i−0 of chunk 1, . . . , n/2 processors will perform layer 1 of chunk i−0, and n processors will perform layer 0 of chunk i. In other words, only $$\sum_{j-0}^{i}\left(\frac{n}{2^j}\right)=2n-\left(\frac{n}{2^i}\right)$$

processors are working at time step i for i<log n, but after the initial log n−1 time steps, all the 2n−1 processors will be working. FIG. 6 depicts the scenario for the initial steps. For the following steps, for j=1, 2, . . . , at time step j+log n, one processor may perform layer log n of chunk j−log n, two processors may perform layer log n−1 of chunk j−log n+1, four processors will perform layer log n−2 of chunk j−log n+2, . . . , n/2, . . . , n/2 processors may perform layer 1 of chunk j−1, and n processors may perform layer 0 of chunk j. This may be summarized as follows: for j=1, 2, . . . , and i=0, 1, . . . , log n, at time j log n, $n/2^{\log n-i}$ processors will perform layer log n−i of data chunk j−log n−i. of chunk j−log n+i.

Figure 7:
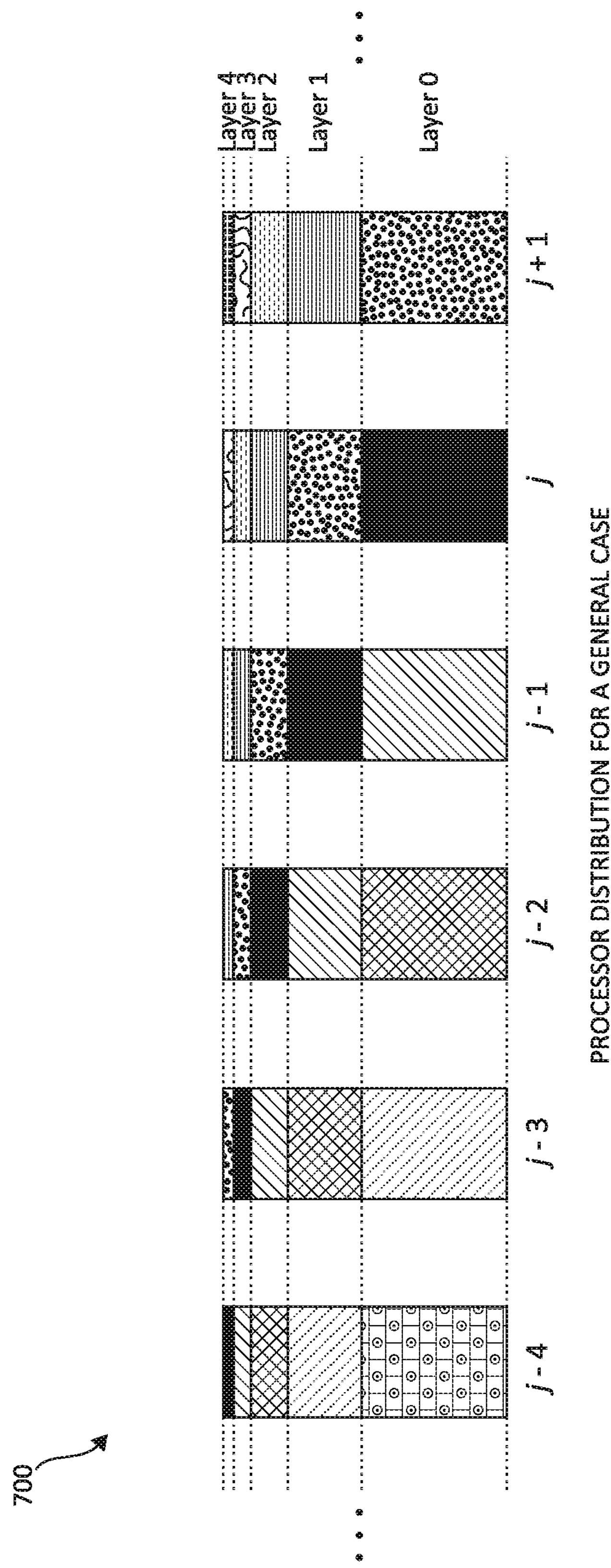
FIG. 7 illustrates an exemplary block diagram showing a processor distribution in which aspects of the present invention may be realized.

FIG. 7 illustrates an exemplary block diagram showing a processor distribution in which aspects of the present invention may be realized. Continuing on from FIGS. 5 and 6, FIG. 7 summarizes the layout of FIG. 6 for a general case after the log n initial steps. As described in FIG. 6, there is a separate drawing for each time step, but each of these time steps are overlaid in FIG. 7. More precisely, each column in FIG. 7 corresponds to one of the chunks (indexed in FIG. 7 as data chunks j−4 to data chunks j+1 to j+1). The various time steps are characterized in FIG. 7 by the various shades where the rectangles with identical fill patterns represent sets of processors working simultaneously. The solid black rectangles represent the set of processors working in parallel at time j−log n: half of them on chunk j, a quarter on chunk j−1 and so forth. The dotted patterns are the working processors in the following step, at time j+log n+1.

Thus, it is observed in FIGS. 6 and 7 that at the transition from one time step to the following time step all the processors move to the subsequent chunk, but remain working on the same previous layer. Looking at a specific chunk, the transition from one time step to the following time step corresponds to passing to the next higher layer and reduces the number of processors working on the following data chunk layer by one half (½).

As a result, by assigning each of the processors to the various layers of the data chunks, no processor will stay idle after the initialization phase of log n time steps, after which all 2n−1 processors will work in parallel on log n consecutive chunks. Moreover, the signature of each of the processed data chunks may be evaluated in log n layers within log n consecutive time steps.

In one embodiment, the mechanisms may design the layout such that the processors are divided into fixed sets of n, n/2, n/4, . . . 2, 1 processors, respectively. As depicted in FIG. 7, the first subset, of n processors, may always be assigned to work on data chunk layer zero (0). The subset of n/2 processors may always be assigned to work on layer j for j=0, 1, . . . log n. Advantages are achieved by this design if different constants are used for the different layers. For example, in the applications used for parallel remainder evaluation, each processor acts on an input consisting of two data blocks. These data blocks are adjacent for layer 0, but for higher layers, the blocks are further apart. The distance between the blocks depends on the index of the layer. This translates to using a constant $C_i$ in the evaluation procedure performed by each of the processors, and this constant is the same for all processors acting within the same layer but the $C_i$ differ from layer to layer. If a given processor is always assigned to the same layer i there is no need to update its constant $C_i$, which may be fixed (e.g., hardwired) into the processor. A possible fixed partition of the indices of processors according to this embodiment is described below in FIG. 8.

FIG. 8 illustrates an exemplary partition of the indices 0 (zero) to 30 (thirty)=2n−2 into layers indexed 0 to 4. Accordingly, we have in this example n=16. The n processors acting on level 0 are those with the even indices, {0, 2, 4, 6, . . . }. The n/2 processors acting on data chunk level 1 may be those with indices that are of the form 1+multiples of 4, {1, 5, 9, 13, . . . }. The n/4 processors acting on data chunk level 2 may be those with indices that are of the form 3+multiples of 8, {3, 11, 19, 27, . . . } etc. In general, the $n/2^i$ processors acting on level i are those with indices that are of the form $2^i-1$+multiples of $2^i+1$ for i=0, 1 . . . , log n. In other words, an equivalent way of describing this partition which also has the advantage of showing that this way of numbering indeed induces a partition, that is, that all indices are accounted for and none of them appears twice, is by referring to the (1+log n)-bit standard binary representation of the numbers 0 to 2n−2: the n even indices are those ending in 0, the indices of layer 1 are those ending in 01, then 011, etc. In general, the indices of layer i are the $n/2^i$ numbers, whose (1+log n)-bit standard binary representation ends in 011, . . . 1, where the length of the string of 1s is i. The table depicted in FIG. 8 brings the partition for n−16 and the indices appearing in decimal and binary form with their suffixes emphasized.

One challenge such design presents is that at each step all the processors may have to read new data and the overhead caused by this input operation may void all the benefits of using parallelization. To address this challenge, FIG. 9 illustrates an exemplary partition of the indices 1 (one) to 31 (thirty-one)=2n−1 into layers indexed 0 to 4. FIG. 9 depicts a more involved indexing scheme by assigning the processors according to their index in such a way that only half of the processors, that is, n of the 2n−1, are required to read new data at each time step, which is the possible minimum because at each time step a new data chunk is accessed. The other n−1 processors may stay with the data they have read when they have been assigned a data chunk at layer 0. This prevents any delay caused by input commands during the log n consecutive steps required to process the data chunks in layers. To further illustrate the explanation corresponding to the general case, and not the initial log n chunks, consider the following example.

The mechanisms may index the 2n−1 processors by the integers from 1 to 2n−1, where it may be assumed that n is a power of 2 (e.g., $n=2^d$). We consider the (left 0-padded) (d+1)-bit binary representation of these indices. For example, for d−4, the indices are 00001, 00010, . . . , 11110 and 11111. The processors are partitioned as follows: the n processors assigned to chunk j are those with odd indices (in other words, those with indices equal to 1 modulo 2), the n/2 processors assigned to chunk j−1 are those with indices ending in 10 (in other words, those with indices equal to 2 modulo 4), and in general, the n/2 processors assigned to chunk j−r are those with indices ending in 10 . . . 0 (1 followed by r−1 zeros, in other words, those with indices equal to $2^i$ modulo $2^{r+1}$) These blocks of processors may be seen in the upper part of FIG. 10 below, where they are ordered, within each column, lexicographically. The fixed suffixes for each block, 1, 10, 100, etc., are boxed for emphasis.

Figure 10:
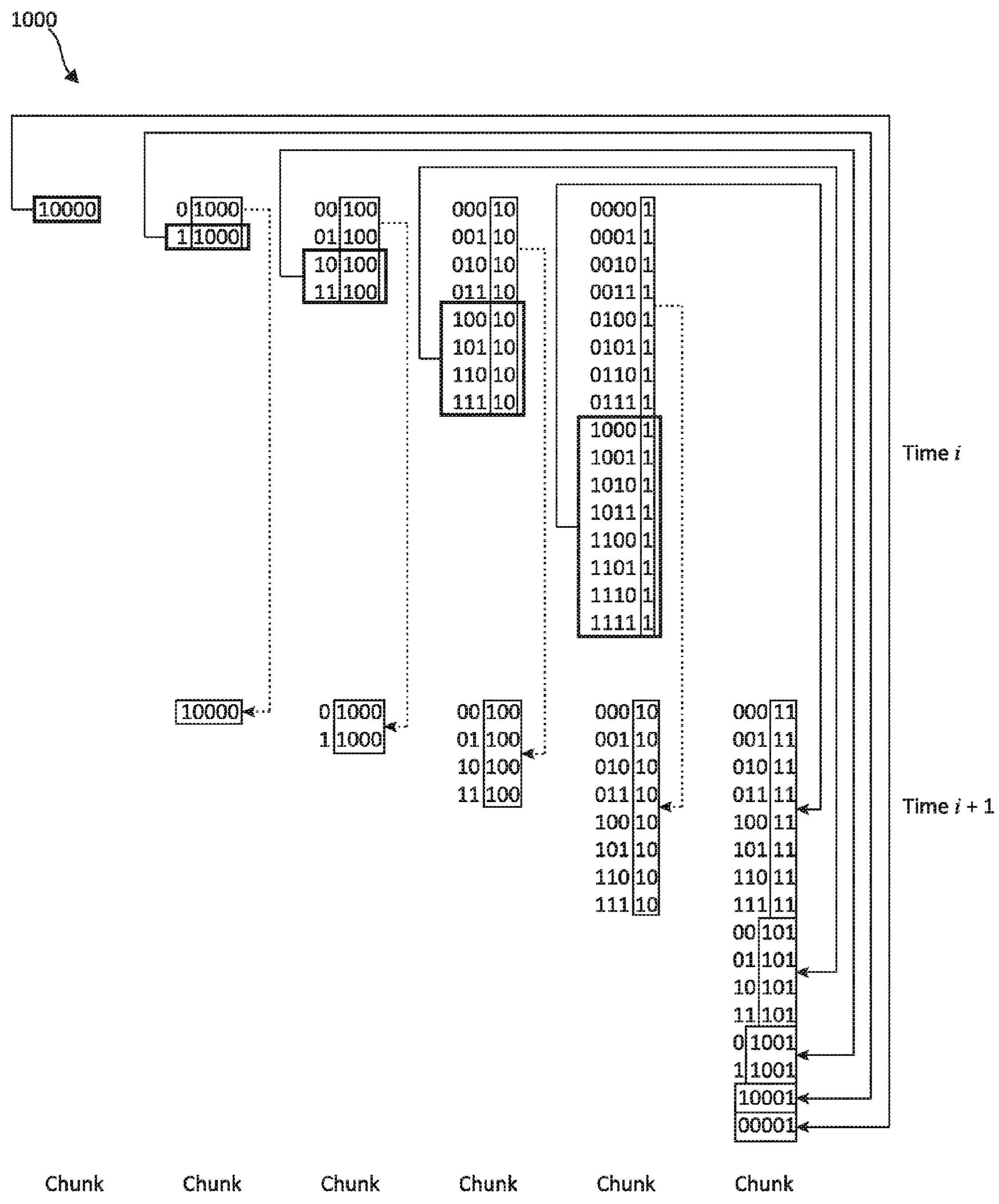
FIG. 10 illustrates an exemplary diagram showing an index set layout for transition from time step i to time step i+1 in which aspects of the present invention may be realized.

FIG. 10 illustrates an exemplary block diagram showing an index set layout for transition from time step i to time step i+1 in which aspects of the present invention may be realized. FIG. 10 shows the details of the transition from time step i to i+1 for d=4 (e.g., n−16). to time step i+1, for d=4 and n=16. Time step i is illustrated for data chunks j−4, j−3, j−2, j−1 and j, and time step i+1 is illustrated for data chunks j−3, j−2, j−1, j and j+1. j−4, j−3, j−2, j−1, j, and j+1.

When passing from time step i to i+1 for d=4 (e.g., n−16). to time step i+1, half of the processors working on each of the currently processed consecutive chunks j, j−1, j−log n are reassigned to the new chunk to be processed, indexed j+1, while the other half remains with the data chunk the processors started with and then may pass to a higher layer. More precisely, all the processors with indices ≥n, whose binary representation starts with 1 (depicted in the bold rectangles of FIG. 10), are assigned to the new chunk, while those with indices <n remain with the earlier data chunk. To achieve a consistent numbering, the following transformation may be applied to each of the indices at the transition between time steps: the index B at time i+1 is obtained from the index A at time i by applying a cyclical shift by one bit left to the binary representation. Such a function is a bijection so that starting with all the numbers between 1 and 2n−1, the same set after the transformation is obtained. For example, if A=11001=25 then B=10011=19, and if A=than B=10100=20, then B=10011=19, and if A=01010=10 then B=10100=20. In other words, the index B is given by the following equation:

$$B = \left\{ \begin{array}{c} 2(A-n)+1 \, If A \geq n \\ 2A \, If A < n \end{array} \right\} \tag{4}$$

As depicted in FIG. 10, all indices in the new chunk j+1 end in 1, all those in chunk j (which is now processing layer 1) end in 10, etc. As can be seen in FIG. 10, the new layout is similar to the one the previous time step. The column of indices of chunk t in the lower part of the figure, corresponding to time i+1, is identical to the column of indices of chunk j−1 in the upper part of the figure, corresponding to time i, for t=j, j−1, j−2, and j−3. The elements in the last column (chunk j+1 in the lower part of the figure) are not ordered lexicographically to emphasize their origin, but one can easily check that this column is just a permutation of the elements in the column of chunk j of the upper part of the figure.

As depicted in FIG. 9, the table summarizes a new layout and induces a partition that is similar to the previous partition table of FIG. 8. An alternative way of interpreting the new partition is by noting a correspondence between the tables of FIG. 8 and FIG. 9. The element indexed i in a certain position of the table in FIG. 8 corresponds to the element indexed i+1 in the same position as the table depicted in FIG. 9.

Thus, as illustrated in FIG. 10, in one embodiment, the invention suggests an indexing mechanism of the processors, which allows assigning the processors to act only on parts of the data chunks at various layers. At each time step transition, a part of the processors are reassigned in such a way that the assignment of processors to data chunks remains invariant, which allows an unlimited sequence of transitions, while constantly keeping all the processors busy.

As will be appreciated by one skilled in the art, aspects of the present invention show only one of the possibilities of implementing the basic idea of the hierarchical layout suggested herein and it is not meant to be restricted to the above parameters. One skilled in the art may generalize the above ideas to different layouts. In particular, the hierarchical tree and the corresponding integer representations do not necessarily need to be binary and may be easily generalized to base k, for any integer k≥3. For example, a ternary layout (k−3) would mean that if on layer 0, n processors are needed to evaluate a function on n chunks, then n/3 rather than n/2 processors may work on the next layer, then n/9 instead of n/4, etc. The assignment of processors at the transition from time step i to i+i may then be based accordingly on the representation of their indices according to a ternary, rather than a binary, base.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for full exploitation, after a plurality of initialization steps, of a set of a plurality of parallel processors to perform a task on a sequence of data chunks by a processor device in a computing environment, wherein each of the data chunks are processed in several time steps and by a plurality of layers with the plurality of layers being dealt with by at least one of a plurality of processors at each of the time steps, the method comprising:

automatically partitioning the set of the plurality of parallel processors into disjoint subsets according to indices of the set of the plurality of parallel processors such that wherein, the plurality of parallel processors are partitioned in accordance with one or more of a plurality of constraints;

the number of the plurality of parallel processors that are available is $n=2^d-1$, where d is the number of the plurality of layers, n is the number of the plurality of parallel processors, and $2^d-1$ is also equal to $n=(2^d)-1$, and a size of each of the disjoint subsets corresponds to a number of the plurality of processors assigned to the processing of the data chunks at one of the plurality of layers;

automatically partitioning the task into the plurality of layers independent of partitioning the set of the plurality of parallel processors;

automatically assigning each of the plurality of processors to the plurality of layers of the task according to the partitioning of the task such that each of the plurality of processors are busy and each of the data chunks are fully processed within a number of the time steps equal to the number of the plurality of layers, wherein the number of the plurality of parallel processors assigned to the processing of the data chunks at one of the plurality of layers is smaller than the number of the plurality of parallel processors assigned to the processing of the data chunks at a preceding one of the plurality of layers;

automatically selecting and using one of a plurality of constraints for restricting any one of the plurality of parallel processors to always work on the same one of the plurality of layers or, for each of the plurality of layers except for a first layer, to always work on a same data chunk as in each of the previous layers; wherein the number of the plurality of parallel processors that are available is $n=2^d-1$, where d is the number of the plurality of layers and n is the number of the plurality of parallel processors and $2^d-1$ is also equal to $n=(2^d)-1$, the number of the plurality of processors assigned to level 0 is $n=2^{d-1}$, and the number of the plurality of processors assigned to the processing of the data chunks at one of the plurality of layers which is not the first is half of the number of the plurality of processors assigned to the processing of the data chunks at the previous one of the plurality of layers;

automatically processing each one of the data chunks within a number of time steps equal to a number of the plurality of layers; and automatically devising a transition function from the indices of the set of the plurality of parallel processors at one of the time steps to the indices of the set of the plurality of parallel processors at a following time step, wherein the transition function is consistent with the assigning.

2. The method of claim 1, further including, subjecting the transition function to the plurality of constraints.

3. The method of claim 2, wherein the plurality of constraints include restricting at least one of the plurality of processors at each of the time steps to the same one of the plurality of layers that is assigned for the processing of the data chunks.

4. The method of claim 2, wherein the plurality of constraints include restricting the set of the plurality of parallel processors that is assigned to the processing of the data chunks at one of the plurality of layers which is not the first to be a subset of the set of the plurality of parallel processors assigned to the processing of the data chunks at previous one of the plurality of layers.

5. The method of claim 1, wherein, if at least one of the plurality of processors, at each of the time steps, is restricted to being assigned to the same one of the plurality of layers for processing of the data chunks:

the plurality of parallel processors are indexed sets by the integers 0 to $2n-2$, the number of the plurality of processors assigned to the processing of the data chunks at one of the plurality of layers indexed i, for $i=0, 1, \ldots, d-1$ is $n/2^i$, and the indices of the plurality of parallel processors of $n/2^i$ are $n/2^i$ numbers that have a standard binary representation of length $d+1$ ending in 0 followed by i ones.

6. The method of claim 1, further including, for each of the plurality of layers except a first one of the plurality of layers, restricting each one of the plurality of processors to the processing of a same data chunk of a previous layers of the plurality of layers, wherein:

the plurality of parallel processors are indexed sets by the integers 1 to $2n-1$, the number of the plurality of processors assigned to the processing of the data chunks at one of the plurality of layers indexed i, for $i=0, 1, \ldots, d-1$ is $n/2^i$, and the indices of the plurality of parallel processors of $n/2^i$ are $n/2^i$ numbers that have a standard binary representation of length $d+1$ ending in 0 followed by i zeros.

7. The method of claim 1, further including, in conjunction with the devising, choosing the transition function as applying a cyclical shift by at least one bit to the left to a standard binary representation of the indices of the plurality of processors.

8. A system for full exploitation, after a plurality of initialization steps, of a set of a plurality of parallel processors to perform a task on a sequence of data chunks in a computing environment, wherein each of the data chunks are processed in several time steps and by a plurality of layers with the plurality of layers being dealt with by at least one of a plurality of processors at each of the time steps, the system comprising:

a processor device operable in the computing environment, wherein the processor device is adapted for:

automatically partitioning the set of the plurality of parallel processors into disjoint subsets according to indices of the set of the plurality of parallel processors wherein, the plurality of parallel processors are partitioned in accordance with one or more of a plurality of constraints, the number of the plurality of parallel processors that are available is $n=2^d-1$, where d is the number of the plurality of layers, n is the number of the plurality of parallel processors, and $2^d-1$ is also equal to $n=(2^d)-1$, and a size of each of the disjoint subsets corresponds to a number of the plurality of processors assigned to the processing of the data chunks at one of the plurality of layers;

automatically partitioning the task into the plurality of layers independent of partitioning the set of the plurality of parallel processors, automatically assigning each of the plurality of processors to the plurality of layers of the task according to the partitioning of the task such that each of the plurality of processors are busy and each of the data chunks are fully processed within a number of the times steps equal to the number of the plurality of layers, wherein the number of the plurality of parallel processors assigned to the processing of the data chunks at one of the plurality of layers is smaller than the number of the plurality of parallel processors assigned to the processing of the data chunks at a preceding one of the plurality of layers;

automatically selecting and using one of a plurality of constraints for restricting any one of the plurality of parallel processors to always work on the same one of the plurality of layers or, for each of the plurality of layers except for a first layer, to always work on a same data chunk as in each of the previous layers; wherein the number of the plurality of parallel processors that are available is $n=2^d-1$, where d is the number of the plurality of layers and n is the number of the plurality of parallel processors and $2^d-1$ is also equal to $n=(2^d)-1$, the number of the plurality of processors assigned to level 0 is n $2^{d-1}$, and the number of the plurality of processors assigned to the processing of the data chunks at one of the plurality of layers which is not the first is half of the number of the plurality of processors assigned to the processing of the data chunks at the previous one of the plurality of layers;

automatically processing each one of the data chunks within a number of time steps equal to a number of the plurality of layers; and automatically devising a transition function from the indices of the set of the plurality of parallel processors at one of the time steps to the indices of the set of the plurality of parallel processors at a following time step, wherein the transition function is consistent with the assigning.

9. The system of claim 8, wherein the processor device is further adapted for subjecting the transition function to the plurality of constraints.

10. The system of claim 9, wherein the plurality of constraints include restricting at least one of the plurality of processors at each of the time steps to the same one of the plurality of layers that is assigned for the processing of the data chunks.

11. The system of claim 9, wherein the plurality of constraints include restricting the set of the plurality of parallel processors that is assigned to the processing of the data chunks at one of the plurality of layers which is not the first to be a subset of the set of the plurality of parallel processors assigned to the processing of the data chunks at previous one of the plurality of layers.

12. The system of claim 8, wherein, if at least one of the plurality of processors, at each of the time steps, is restricted to being assigned to the same one of the plurality of layers for processing of the data chunks:

the plurality of parallel processors are indexed sets by the integers 0 to $2n-2$, the number of the plurality of processors assigned to the processing of the data chunks at one of the plurality of layers indexed i, for $i=0, 1, \ldots, d-1$ is $n/2^i$, and the indices of the plurality of parallel processors of $n/2^i$ are $n/2^i$ numbers that have a standard binary representation of length $d+1$ ending in 0 followed by i ones.

13. The system of claim 8, further including, for each of the plurality of layers except a first one of the plurality of layers, restricting each one of the plurality of processors to the processing of a same data chunk of a previous layers of the plurality of layers, wherein:

the plurality of parallel processors are indexed sets by the integers 1 to $2n-1$, the number of the plurality of processors assigned to the processing of the data chunks at one of the plurality of layers indexed i, for i=0, 1, . . . , d−1 is $n/2^i$, and the indices of the plurality of parallel processors of $n/2^i$ are $n/2^i$ numbers that have a standard binary representation of length d+1 ending in 0 followed by i zeros.

14. The system of claim 8, wherein the processor device is further adapted for, in conjunction with the devising, choosing the transition function as applying a cyclical shift by at least one bit to the left to a standard binary representation of the indices of the plurality of processors.

15. A computer program product for full exploitation, after a plurality of initialization steps, of a set of a plurality of parallel processors to perform a task on a sequence of data chunks by a processor device in a computing storage environment, wherein each of the data chunks are processed in several time steps and by a plurality of layers with the plurality of layers being dealt with by at least one of a plurality of processors at each of the time steps, the computer program product comprising a non-transitory computer-readable storage medium having computer-readable program code portions stored therein, the computer-readable program code portions comprising:

an executable portion for automatically partitioning the set of the plurality of parallel processors into disjoint subsets, according to indices of the set of the plurality of parallel processors such that a size of each of the disjoint subsets corresponds to a number of the plurality of processors assigned to the processing of the data chunks at one of the plurality of layers;

an executable portion for automatically partitioning the task into the plurality of layers independent of partitioning the set of the plurality of parallel processors;

an executable portion for automatically assigning each of the plurality of processors to the plurality of layers of the task according to the partitioning of the task such that each of the plurality of processors are busy and each of the data chunks are fully processed within number of the time steps equal to the number of the plurality of layers, wherein the number of the plurality of parallel processors assigned to the processing of the data chunks at one of the plurality of layers is smaller than the number of the plurality of parallel processors assigned to the processing of the data chunks at a preceding one of the plurality of layers;

an executable portion for automatically selecting and using one of a plurality of constraints for restricting any one of the plurality of parallel processors to always work on the same one of the plurality of layers or, for each of the plurality of layers except for a first layer, to always work on a same data chunk as in each of the previous layers; wherein the number of the plurality of parallel processors that are available is $n=2^d-1$, where d is the number of the plurality of layers and n is the number of the plurality of parallel processors and $2^d-1$ is also equal to $n=(2^d)-1$, the number of the plurality of processors assigned to level 0 is $n=2^{d-1}$, and the number of the plurality of processors assigned to the processing of the data chunks at one of the plurality of layers which is not the first is half of the number of the plurality of processors assigned to the processing of the data chunks at the previous one of the plurality of layers;

automatically processing each one of the data chunks within a number of time steps equal to a number of the plurality of layers; and automatically devising a transition function from the indices of the set of the plurality of parallel processors at one of the time steps to the indices of the set of the plurality of parallel processors at a following time step, wherein the transition function is consistent with the assigning.

16. The computer program product of claim 15, further including an executable portion subjecting the transition function to the plurality of constraints.

17. The computer program product of claim 16, wherein the plurality of constraints include restricting at least one of the plurality of processors at each of the time steps to the same one of the plurality of layers that is assigned for the processing of the data chunks.

18. The computer program product of claim 16, wherein the plurality of constraints include restricting the set of the plurality of parallel processors that is assigned to the processing of the data chunks at one of the plurality of layers which is not the first to be a subset of the set of the plurality of parallel processors assigned to the processing of the data chunks at previous one of the plurality of layers.

19. The computer program product of claim 15, wherein, if at least one of the plurality of processors, at each of the time steps, is restricted to being assigned to the same one of the plurality of layers for processing of the data chunks:

the plurality of parallel processors are indexed sets by the integers 0 to 2n−2, the number of the plurality of processors assigned to the processing of the data chunks at one of the plurality of layers indexed i, for i=0, 1, . . . , d−1 is $n/2^i$, and the indices of the plurality of parallel processors of $n/2^i$ are $n/2^i$ numbers that have a standard binary representation of length d+1 ending in 0 followed by i ones.

20. The computer program product of claim 15, further including, for each of the plurality of layers except a first one of the plurality of layers, an executable portion for restricting each one of the plurality of processors to the processing of a same data chunk of a previous layers of the plurality of layers, wherein the plurality of parallel processors are indexed sets by the integers 1 to 2n−1, the number of the plurality of processors assigned to the processing of the data chunks at one of the plurality of layers indexed i, for i=0, 1, . . . , d−1 is $n/2^i$, and the indices of the plurality of parallel processors of $n/2^i$ are $n/2^i$ numbers that have a standard binary representation of length d+1 ending in 0 followed by i zeros.

21. The computer program product of claim 15, further including an executable portion for, in conjunction with the devising, choosing the transition function as applying a cyclical shift by at least one bit to the left to a standard binary representation of the indices of the plurality of processors.

* * * * *